United States Patent [19]

Page

[11] Patent Number: 5,085,056

[45] Date of Patent: Feb. 4, 1992

[54] METHOD AND APPARATUS FOR ATOMIZING (PARTICULATING) COOLED FLUID SLUGS IN A PULSED FLUID COOLING SYSTEM

[75] Inventor: Steven E. Page, Friendswood, Tex.

[73] Assignee: Phillips Petroleum Company, Bartlesville, Okla.

[21] Appl. No.: 570,671

[22] Filed: Aug. 22, 1990

[51] Int. Cl.$^5$ ............................................. F25D 17/02
[52] U.S. Cl. ......................................... 62/64; 62/70; 264/40.6; 425/144; 425/378.1
[58] Field of Search ........................... 62/64, 69, 70; 264/40.6; 425/144, 378.1

[56] References Cited

U.S. PATENT DOCUMENTS

| | | | |
|---|---|---|---|
| 3,522,337 | 7/1970 | Ball | 425/378.1 |
| 3,659,428 | 5/1972 | Kunioka et al. | 62/64 |
| 4,033,737 | 7/1977 | Kunioka et al. | 62/64 |
| 4,555,909 | 12/1985 | Gourdine | 62/64 |
| 4,767,301 | 8/1988 | Volk, Jr. | 425/378.1 |

FOREIGN PATENT DOCUMENTS

| | | |
|---|---|---|
| 454102 | 9/1936 | United Kingdom .......... 62/64 |
| 623674 | 5/1949 | United Kingdom . |
| 1360473 | 7/1974 | United Kingdom . |

Primary Examiner—Ronald C. Capossela
Attorney, Agent, or Firm—David L. Kinsinger

[57] ABSTRACT

Improved method and apparatus for providing efficient cooling of a hot body using a pulse cooling system is disclosed. A flow of compressed gas is used to atomize each pulse of fluid before it enters the cooling channel of the hot body. The atomization of the fluid pulses allows each fluid pulse to be completely vaporized within the cooling channel, and, therefore, allows the hot body to be more efficiently cooled.

5 Claims, 1 Drawing Sheet

METHOD AND APPARATUS FOR ATOMIZING (PARTICULATING) COOLED FLUID SLUGS IN A PULSED FLUID COOLING SYSTEM

BACKGROUND OF THE INVENTION

The present invention relates generally to cooling systems, and more particularly, but not by way of limitation, to pulsed cooling systems.

Pulsed cooling systems are well known, and several of these types of cooling systems have been put into successful, practical application. These systems operate by sending pulses of fluid through a cooling channel that is in direct contact with the process equipment that is to be cooled. The pulse, or slug, of liquid is vaporized in the cooling channel, thus transferring heat away from the hot process equipment. One of the continuing problems with these types of cooling systems is, in some situations, the pressure generated when a part of the pulse vaporizes rapidly forces the remaining portion of the pulse of cooling liquid through the cooling channel before it can be vaporized. This severely decreases cooling efficiency. In order for the pulse cooling system to operate efficiently, all of each pulse of cooling fluid must be vaporized completely in the cooling channel so as to carry away as much heat as possible from the cooling channel.

SUMMARY OF THE INVENTION

It is the object of this invention to provide an efficient pulsed fluid cooling process for cooling process equipment.

In accordance with this invention, there is provided a pulse cooling process in which a continuous flow of compressed gas is directed into a cooling channel of a pulse cooling system so as to atomize or particulate the liquid pulses passing through the channel and allow complete vaporization of the atomized liquid pulses which results in cooling of the process equipment through which the cooling channel passes.

DETAILED DESCRIPTION OF THE INVENTION

Figure 1:
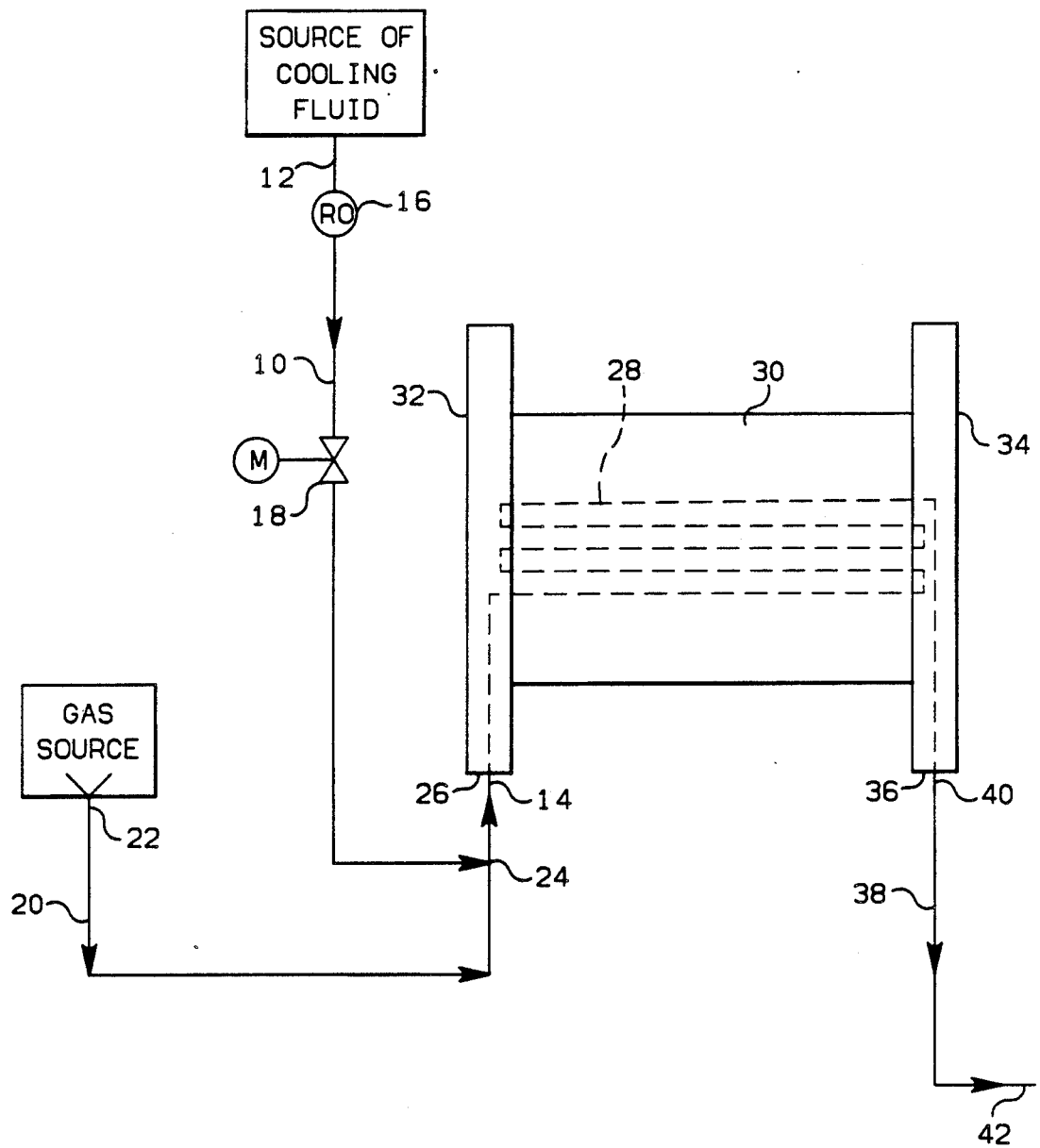
FIG. 1 is a schematic diagram of a cooling system used to cool an extruder barrel.

Referring now to FIG. 1, there is illustrated a schematic diagram showing the present invention as used to cool an extruder barrel, such as an extruder barrel employed in the pelletizing of a polymeric material. The diagram shows a first conduit 10 having a first end 12 and a second end 14. The first end 12 is connected in fluid flow communication with a suitable source of cooling fluid or liquid coolant. A restrictive orifice 16 is interposed in the conduit 10 near the first end 12 to limit the amount of fluid that can be directed through the first conduit 10.

A fluid pulsation means 18 is interposed in the first conduit 10 between the first end 12 and the second end 14. Preferably, the fluid pulsation means 18 comprises a motor-driven or piston-actuated ball valve capable of alternately opening and closing the first conduit 10 to fluid flow therethrough; although, any apparatus capable of converting a constant flow of fluid into a series of separate fluid pulses is within the scope of this invention.

A second conduit 20 having a first end 22 and a second end 24 is positioned so that the second end 24 is connected in fluid flow communication to the first conduit 10 between the fluid pulsation means 18 and the second end 14 of the first conduit 10.

The second end 14 is attached to the first end 26 of a cooling channel 28 of an extruder barrel 30. The extruder barrel 30 can be for any type of extrusion equipment, such as a twin screw extruder used for making polypropylene pellets. Although an extruder is the preferred object to be cooled by the present invention, any apparatus with fluid cooling channels can be cooled by the present invention.

The cooling channel 28 passes through the wall of the extruder barrel 30 from the first end 32 of the extruder barrel to the second end 34 of the extruder barrel and exits the extruder barrel 30 at the second end 36 of the cooling channel. Preferably, the cooling channel 28 passes the length of the extruder barrel 30 near the inside wall of the extruder barrel 30. More preferably, the cooling channel 28 makes a serpentine path back and forth from the first end 32 to the second end 34 of the extruder barrel 30 near the inside wall of the extruder barrel before exiting the extruder barrel 30 at the second end 36 so as to cover a maximum amount of surface area around the inside wall of the extruder barrel 30.

A third conduit 38, having a first end 40 and a second end 42, is connected in fluid flow communication with the second end 36 of the cooling channel 28 at the first end 40. The second end 42 is open to the atmosphere.

The process of the present invention comprises directing a cooling fluid in liquid form from the source thereof into the first conduit 10 and through the restrictive orifice 16. The amount of liquid cooling fluid that is directed through said first conduit 10 is dependent upon the temperature that is desired to be maintained in the extruder barrel 30.

The cooling fluid passes through the first conduit 10 into the fluid pulsation means 18. The fluid pulsation means 18 converts the flow of liquid cooling fluid into a series of separate fluid pulses. These fluid pulses are directed through the remainder of the first conduit 10 to the second end 14 of the first conduit. The size of the liquid fluid pulses and separation distance between each fluid pulse are determined by the operation of said fluid pulsation means 18. This size and distance determination is based on the temperature control needs of the extruder barrel 30.

A constant stream of compressed gas is directed from a suitable source into the second conduit 20 through first end 22 thereof. This stream can be comprised of any gas; although, nitrogen is presently preferred as when it is mixed with water it will not rust the steel that may exist on the walls of the cooling channel 28. The compressed gas flow rate is determined based on the temperature control needs of the extruder barrel 30.

The compressed gas exits the second conduit 28 through the second end 24 thereof and enters the first conduit 10 between the fluid pulsation means 18 and second end 14 of the first conduit 10. The flow of the compressed gas through the first conduit 10 results in atomization of the liquid fluid pulses passing through the first conduit 10. The atomization of the liquid fluid pulses is critical to the effective operation of the present invention.

The atomized liquid fluid pulses pass through the second end 14 of the first conduit 10 and into the cooling channel 28. As the atomized liquid fluid pulses pass through the cooling channel 28 from the first end 26 to the second end 36, the heat from the extruder barrel 30 completely vaporizes the atomized liquid fluid pulses. This vaporization removes heat from the extruder barrel 30 and therefor results in a cooling of the extruder barrel 30. Complete vaporization of the liquid fluid pulses is necessary for efficient cooling of the extruder 30. Atomization of the liquid fluid pulses allows the liquid fluid pulses to be completely vaporized in the cooling channel 28, thus resulting in efficient cooling of the extruder barrel 30.

The vaporized fluid exits the cooling channel 30 through the second end 36 thereof and enters the third conduit 38 through the first end 40 of the conduit 38. The vaporized fluid passes through the third conduit 38 and exits the third conduit 38 through the second end 42 thereof into the atmosphere.

It will be seen that the method and apparatus described above provides advantages in pulsed fluid cooling, notably in the increased efficiency due to the complete vaporization of the pulsed atomized liquid fluid in the cooling channel.

That which is claimed is:

1. A method for cooling a hot body having a cooling channel formed therein, comprising the steps of:
   directing a liquid coolant through a first conduit having a first end and a second end;
   pulsating said liquid coolant within said first conduit so as to create a series of liquid coolant pulses passing through said first conduit towards said second end;
   directing a pressurized gas stream through a second conduit and into said first conduit so as to atomize each of said liquid coolant pulses in said first conduit resulting in a series of atomized liquid coolant pulses;
   directing said atomized liquid coolant pulses through the second end of said first conduit into the cooling channel formed in said hot body so as to vaporize said atomized liquid coolant pulses thereby forming vaporized liquid coolant and resulting in cooling of said hot body; and
   directing the thus formed vaporized liquid coolant from said cooling channel.

2. The method of claim 1 wherein said hot body comprises an extruder barrel.

3. The method of claim 1 wherein the vaporized liquid coolant is directed from said cooling channel to the atmosphere.

4. Apparatus for cooling a hot body having a cooling channel with first and second ends formed therein, comprising:
   a first conduit having a first end and a second end with the first end thereof connected in fluid flow communication with a source of liquid coolant, and with the second end thereof connected in fluid flow communication with the first end of said cooling channel;
   fluid pulsation means interposed in said first conduit for creating a series of liquid coolant pulses in liquid passing through said first conduit into said cooling channel; and
   a second conduit having a first end and a second end with the first end thereof connected in fluid flow communication with a source of pressurized gas, and with the second end thereof connected in fluid flow communication with said first conduit intermediate said fluid pulsation means and said cooling channel.

5. Apparatus in accordance with claim 4 wherein said fluid pulsation means is characterized further to include a valve interposed in said first conduit and drive motor means operatively connected to said valve for closing said valve to fluid flow therethrough and, alternately, for opening said valve for fluid flow therethrough.

* * * * *

UNITED STATES PATENT AND TRADEMARK OFFICE
CERTIFICATE OF CORRECTION

PATENT NO.    : 5,085,056

DATED         : February 4, 1992

INVENTOR(S)   : Steven E. Page and Danny L. Gray

It is certified that error appears in the above-identified patent and that said Letters Patent is hereby corrected as shown below:

Title page, item [75] Inventor: add the following
-- Danny L. Gray, Houston, Texas--.

Signed and Sealed this

Twentieth Day of April, 1993

Attest:

MICHAEL K. KIRK

*Attesting Officer*   Acting Commissioner of Patents and Trademarks